United States Patent [19]
Kato

[11] Patent Number: 5,905,605
[45] Date of Patent: May 18, 1999

[54] CHUCK ARRANGEMENT FOR A FLOPPY DISK DRIVE FOR ACCURATELY AND POSITIVELY ENGAGING A FLOPPY DISK

[75] Inventor: Yoshihisa Kato, Yonago, Japan

[73] Assignee: Matsushita Electric Industrial Co., Ltd., Osaka, Japan

[21] Appl. No.: 08/950,736

[22] Filed: Oct. 15, 1997

Related U.S. Application Data

[63] Continuation of application No. 08/655,829, May 31, 1996, abandoned.

[30] Foreign Application Priority Data

Jun. 13, 1995 [JP] Japan ................................. 7-145995

[51] Int. Cl.$^6$ .................................................. G11B 19/20
[52] U.S. Cl. ............................................... 360/99.04
[58] Field of Search ........................... 360/99.04, 99.05, 360/99.08, 99.12

[56] References Cited

U.S. PATENT DOCUMENTS

| 5,121,272 | 6/1992 | MaeKawa et al. | 360/99.04 |
| 5,247,409 | 9/1993 | Sakaguchi | 360/99.04 |
| 5,257,152 | 10/1993 | Nagase | 360/99.04 |
| 5,469,421 | 11/1995 | Aruga et al. | 360/99.08 |

FOREIGN PATENT DOCUMENTS

| 1-173470 | 7/1989 | Japan . |
| 5-41026 | 2/1993 | Japan . |
| 5 50563 | 7/1993 | Japan . |
| 5-258453 | 10/1993 | Japan . |
| 7-12833 | 1/1995 | Japan . |

*Primary Examiner*—David D. Davis
*Attorney, Agent, or Firm*—Pollock, Vande Sande & Amernick

[57] ABSTRACT

A hub base 1, having a height not larger than 4.5 mm from an upper surface of a copper foil on a printed circuit board 5, is fixed with a rotor frame 2. A medium holding magnet 3 is provided around hub base 1 and integral with rotor frame 2. A leaf spring 6 is swingably supported on rotor frame 2. A drive pin 8 is mounted on leaf spring 6. An index magnet 10 is integrally formed with rotor frame 2. A magnetization pattern applied on medium holding magnet 3 is in-phase with a magnetization pattern applied on index magnet 10. An upper end of index magnet 10 is positioned lower in height than a top of medium holding magnet 3 which protrudes from an upper surface of rotor frame 2.

2 Claims, 4 Drawing Sheets

CHUCK ARRANGEMENT FOR A FLOPPY DISK DRIVE FOR ACCURATELY AND POSITIVELY ENGAGING A FLOPPY DISK

This application is a continuation of U.S. patent application Ser. No. 08/655,829, filed May 31, 1996 now abandoned.

BACKGROUND OF THE INVENTION

1. Field of the Invention

The present invention generally relates to a chucking hub arrangement of a spindle motor used in a floppy disk drive.

2. Prior Art

Floppy disk drives of today are in the trend of thin thickness, high accuracy and low cost. Spindle motors used in these floppy disk drives are accordingly required to be thin in thickness, accurate in performance, and cheap in cost.

Hereinafter, a conventional chucking hub arrangement of a spindle motor used in a floppy disk drive will be explained. This conventional chucking hub arrangement is used for the floppy disk drive having a hub base with the height not larger than 4.5 mm from the upper surface of a copper foil of a printed circuit board.

FIG. 3 is a cross-sectional view, in half, showing a spindle motor having a conventional chucking hub arrangement. FIG. 4 is a plan view showing the spindle motor of FIG. 3, seen from a drive pin side. A magnetic distribution or magnetization pattern is also shown in FIG. 3.

In FIGS. 3 and 4, hub base 1 is securely fixed with a rotor frame 2. An index magnet 3a is securely fixed to a medium holding magnet 3 integrally or by using bond. Around hub base 1, medium holding magnet 3 is securely fixed to rotor frame 2 integrally by molding or by using bond.

Medium holding magnet 3 is magnetized from the direction of an arrow A, while index magnet 3a is magnetized from the direction of an arrow B as shown in FIG. 3. And, as a result of such magnetization, a predetermined magnetic distribution or magnetization pattern is obtained as shown in FIG. 4.

A magnetic field sensing element 4 is fixed on an upper surface of a printed circuit board 5, to detect the magnetic distribution or magnetization pattern of index magnet 3a. A leaf spring 6 is swingable about a support shaft 7 securely fixed to rotor frame 2. A drive pin 8 is mounted on one end of leaf spring 6. The other end of leaf spring 6 is connected via spring 9 to a hook 2a provided on rotor frame 2.

An operation of the above-described chucking hub arrangement will be explained hereinafter.

First, a metal hub (not shown) of a recording medium is captured or drawn on a predetermined position on the upper surface of hub base 1 by medium holding magnet 3. A reference hole formed on the metal hub is engaged with drive pin 8 under application of a side pressure by spring 9. Then, the recording medium (not shown) is rotated by actuating the motor.

A recording-start-reference position of the recording medium is determined by an index signal. This index signal is generated once a complete revolution of the recording medium by the cooperation of index magnet 3a and magnetic field sensing element 4.

However, the above-described conventional arrangement was not reliable due to its inherent structural drawback. According to the above-described conventional arrangement, index magnet 3a is securely fixed to medium holding magnet 3 integrally by molding or by using bond. Hence, magnetizing index magnet 3a from the direction of arrow B, after medium holding magnet 3 is magnetized from the direction of arrow A, is likely to adversely affect to the magnetic distribution or magnetization pattern already formed on medium holding magnet 3. Such disturbance of magnetization will lead to the failure in the chucking operation, since the recording medium cannot be held stably on hub base 1.

On the contrary, if medium holding magnet 3 is magnetized from the direction of arrow A after index magnet 3a is magnetized from the direction of arrow B, an adverse effect will be given to the magnetic distribution or magnetization pattern already formed on index magnet 3a. This disturbance of magnetization will result in the deterioration of the index signal in its stability and accuracy, possibly causing dislocation of the recording-start-reference position of the recording medium leading to a fatal deficiency derived from this dislocation.

Even if the above-described magnetizations from the directions of arrow A and arrow B are simultaneously performed, the magnetization applied on medium holding magnet 3 will interfere with the magnetization applied on index magnet 3a because their phases are offset from each other. Hence, the above-described chucking error or the dislocation of the recording-start-reference position of the recording medium will arise.

In addition, the above-described conventional arrangement requires to apply the side pressure to drive pin 8 by spring 9 in order to avoid the above-described chucking error and stably accomplish the chucking operation. This will necessarily increase the number of parts and also increase the steps in the assembling of a product, accompanied by the increase of costs.

SUMMARY OF THE INVENTION

Accordingly, in view of above-described problems encountered in the prior art, a principal object of the present invention is to provide a stable and highly accurate chucking hub arrangement of a spindle motor used in a floppy disk drive.

In order to accomplish this and other related objects, the present invention provides a novel and excellent chucking hub arrangement of a spindle motor used in a floppy disk drive comprising: a hub base having a height not larger than 4.5 mm from an upper surface of a copper foil on a printed circuit board; a rotor frame fixed to the hub base; a medium holding magnet provided around the hub base and integral with the rotor frame; a leaf spring swingably supported on the rotor frame; a drive pin mounted on the leaf spring; and an index magnet integral with the rotor frame.

According to the features of a preferred embodiment of the present invention, a magnetization pattern applied on the medium holding magnet is in-phase with a magnetization pattern applied on the index magnet. And, an upper end of the index magnet is positioned lower in height than a top of the medium holding magnet which protrudes from an upper surface of the rotor frame.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENT

Figure 1:
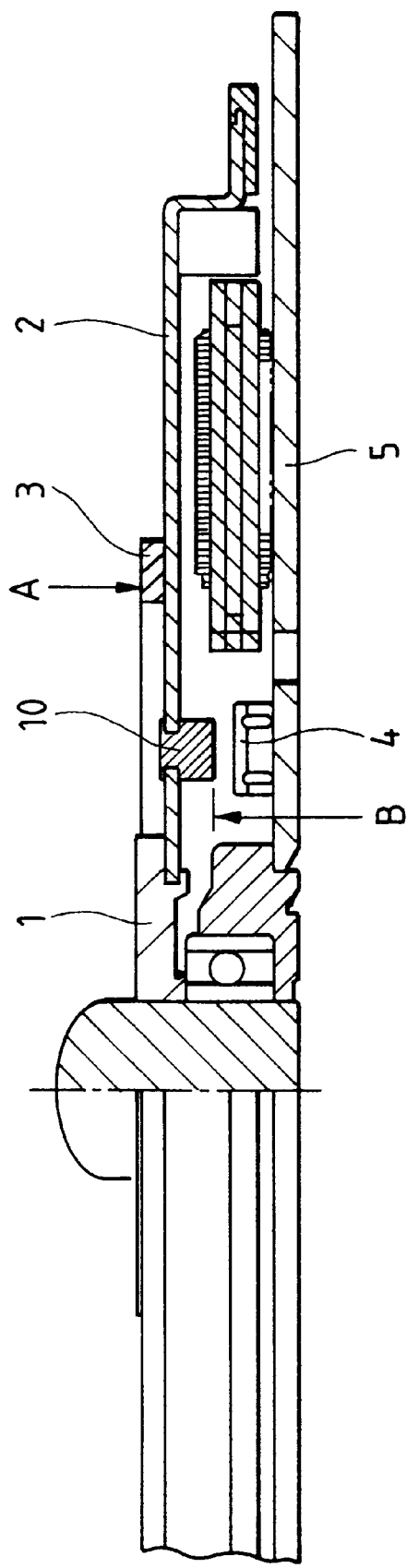
FIG. 1 is a cross-sectional view, in half, showing a spindle motor having a chucking hub arrangement in accordance with a preferred embodiment of the present invention.

A preferred embodiment of the present invention will be explained in greater detail hereinafter, with reference to the accompanying drawings. Identical parts are denoted by an identical reference numeral throughout views.

Figure 2:
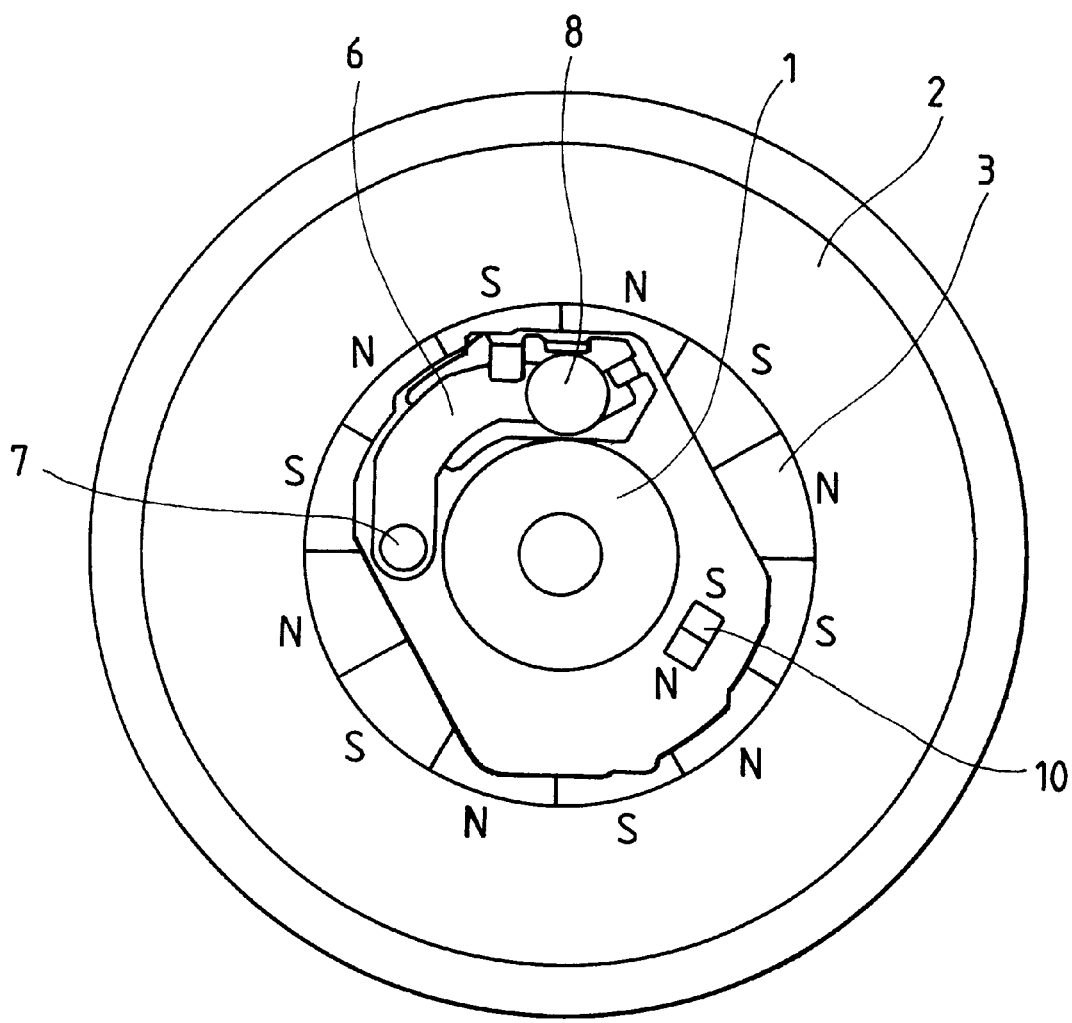
FIG. 2 is a plan view showing the spindle motor of FIG. 1, seen from a drive pin side thereof.
Figure 3:
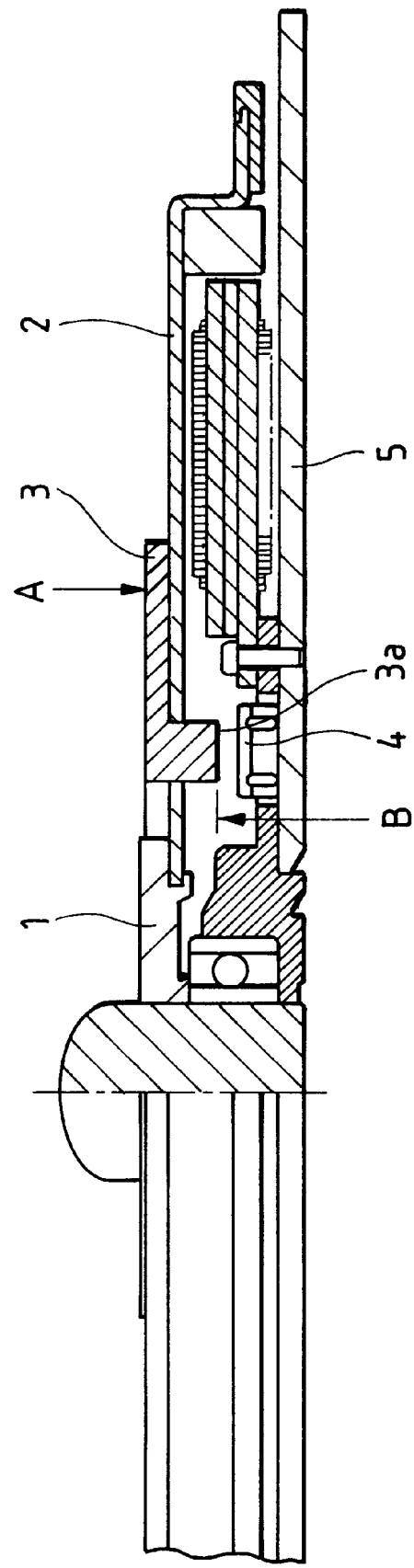
FIG. 3 is a cross-sectional view, in half, showing a spindle motor having a conventional chucking hub arrangement.
Figure 4:
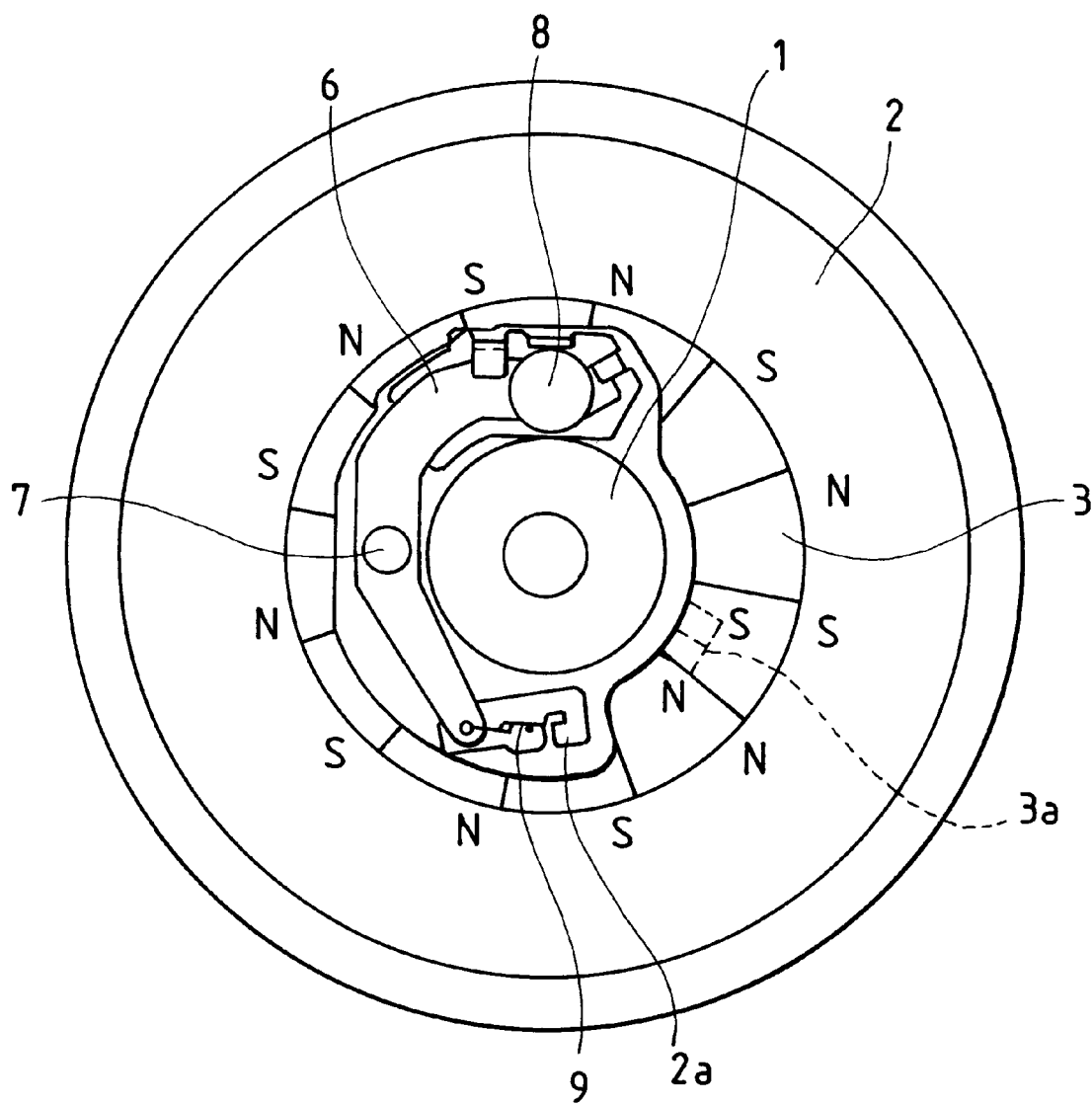
FIG. 4 is a plan view showing the spindle motor of FIG. 3, seen from a drive pin side thereof.

FIG. 1 is a cross-sectional view, in half, showing a spindle motor having a chucking hub arrangement in accordance with a preferred embodiment of the present invention. FIG. 2 is a plan view showing the spindle motor of FIG. 1, seen from a drive pin side thereof. Magnetic distribution or magnetization pattern is also shown in FIG. 2. The chucking hub arrangement of the preferred embodiment of the present invention is used for the floppy disk drive.

In FIGS. 1 and 2, hub base 1 is securely fixed with a rotor frame 2. Hub base 1 has the height not larger than 4.5 mm from the upper surface of a copper foil of a printed circuit board 5. Around hub base 1, a medium holding magnet 3 is securely fixed to rotor frame 2 integrally by molding or by using bond. An index magnet 10 is securely fixed to rotor frame 2 integrally by molding or by bonding. Index magnet 10 is separated from medium holding magnet 3 a radial direction of rotor frame 2. The upper end of index magnet 10 is positioned lower in height than the top of medium holding magnet 3. The top of medium holding magnet protrudes from the upper surface of rotor frame 2.

A magnetic field sensing element 4 is fixed on the upper surface of printed circuit board 5, to detect the magnetic distribution or magnetization pattern of index magnet 10. A leaf spring 6 is supported at its base end in a cantilever fashion on a support shaft 7 which is securely fixed to rotor frame 2, and is swingable about this support shaft 7. A drive pin 8 is mounted on the distal end of leaf spring 6.

Medium holding magnet 3 is magnetized from the direction of arrow A, while index magnet 10 is magnetized from the direction of arrow B as shown in FIG. 1. In this embodiment, the magnetization pattern of medium holding magnet 3 is in-phase with the magnetization pattern of index magnet 10.

An operation of the above-described chucking hub arrangement will be explained hereinafter, with reference to FIGS. 1 and 2.

First, a metal hub (not shown) of a recording medium is captured or drawn on a predetermined position on the upper surface of hub base 1 by medium holding magnet 3. A reference hole formed on the metal hub is engaged with drive pin 8. Then, the recording medium (not shown) is rotated by actuating the motor.

In this case, an attracting or capturing force acting from index magnet 10 to the metal hub is very small because index magnet 10 is integral with rotor frame 2 and the upper end of index magnet 10 is positioned lower in height than the top of medium holding magnet 3 which protrudes from the upper surface of rotor frame 2. Thus, the metal hub can be stably placed on hub base 1; hence, it becomes possible to prevent any chucking error.

The index signal, generated once a complete revolution of the recording medium by the cooperation of index magnet 10 and magnetic field sensing element 4, is highly accurate due to the above-described reasons and by the phase relation that the magnetization pattern of medium holding magnet 3 is in-phase with the magnetization pattern of index magnet 10.

Thus, it becomes possible to eliminate the dislocation of the recording-start-reference position of the medium. In addition, the excellent stability of the chuck obtained from the arrangement of the present invention no longer requires the side pressure. In other words, the arrangement of the present invention makes it possible to greatly reduce the number of parts and time required in the assembling, thus realizing the cost reduction of each chucking hub of a spindle motor.

As apparent from the foregoing description, the index magnet is integral with the rotor frame and separated from the medium holding magnet. The upper end of the index magnet is positioned lower in height than the top of the medium holding magnet which protrudes from an upper surface of the rotor frame. Hence, it becomes possible to greatly reduce the adverse effect from the magnetization applied to the medium holding magnet to the index magnet, and to the contrary to greatly reduce the adverse effect from the magnetization applied to the index magnet to the medium holding magnet.

Furthermore, the magnetization pattern of the medium holding magnet is in-phase with the magnetization pattern of the index magnet. Such an in-phase relation in the magnetization pattern between the medium holding magnet and the index magnet 10 is is effective to completely cancel the above-described mutual magnetization. It is, therefore, not necessary to apply a side pressure to the drive pin. Accordingly, it becomes possible to provide a chucking hub arrangement which is stable and highly accurate in operation, cheap in cost, and free from the dislocation of the recording-start-reference position of the medium.

As this invention may be embodied in several forms without departing from the spirit of essential characteristics thereof, the present embodiment described is therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A chucking hub arrangement of a spindle motor used in a floppy disk drive, comprising:

a hub base having a height extending above an upper surface of a copper foil on a printed circuit board;

a rotor frame fixed to said hub base;

a medium holding magnet provided around said hub base and fixed to an upper surface of said rotor frame;

a leaf spring swingably supported on said rotor frame;

a drive pin mounted on said leaf spring; and an index magnet integrally fixed with said rotor frame for establishing a reference position and spaced apart from said medium holding magnet at a position radially inward than an outermost position of said medium holding magnet, said index magnet extending away from a lower surface of said rotor frame reducing magnetization between said index magnet and medium holding magnet thereby increasing the ability of said medium holding magnet to stably support a medium on said hub base without dislocating said reference position wherein an upper end of said index magnet is positioned above said upper surface of said rotor frame at a position lower in height than a top of said medium holding magnet which extends from said upper surface of said rotor frame.

2. The chucking hub arrangement in accordance with claim 1, wherein a first magnetization pattern applied on said medium holding magnet is in-phase with a second magnetization pattern applied on said index magnet.

* * * * *